March 31, 1931.  M. H. SMITH  1,798,709
NOZZLE
Filed May 3, 1929
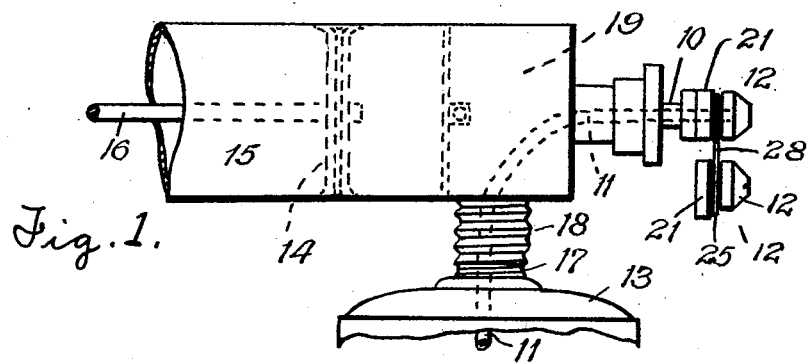
Fig. 1.
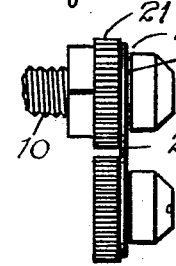
Fig. 2.
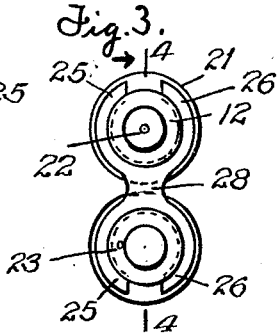
Fig. 3.
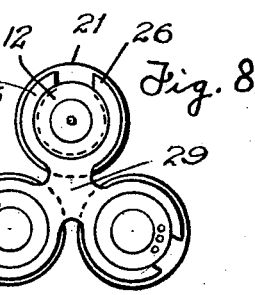
Fig. 8.
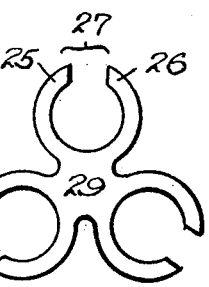
Fig. 4.
Fig. 7.
Fig. 9.
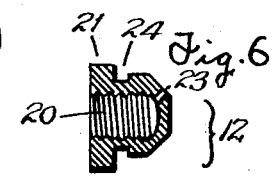
Fig. 6.
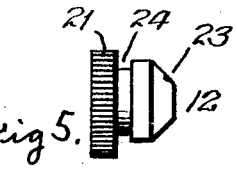
Fig. 5.
Fig. 10.
INVENTOR
Myron H. Smith
BY Martin & Rendell
ATTORNEYS Patented Mar. 31, 1931

1,798,709

UNITED STATES PATENT OFFICE

MYRON H. SMITH, OF UTICA, NEW YORK, ASSIGNOR TO D. B. SMITH & COMPANY, INC., OF UTICA, NEW YORK, A CORPORATION OF NEW YORK

NOZZLE

Application filed May 3, 1929. Serial No. 360,200.

My present invention relates to sprayer nozzle sets.

The purpose of this invention is to provide a sprayer nozzle set having an improved, novel and simple form of nozzle construction and connection whereby any one of two or more nozzles of varying outlet formation may be mounted in operative connection upon the outlet from a sprayer or hose without interference by the other nozzle and yet have the other nozzle securely attached to the operative nozzle and ready to be used in place thereof.

Further purposes and advantages of the invention will appear from the specification and claims herein.

Fig. 1 is a side view of the relevant portions of a sprayer equipped with a nozzle set embodying my invention and having two nozzles.

Fig. 2 is a side view of said pair of nozzles and their connecting link and the forward portion of the air outlet pipe of the sprayer on a somewhat enlarged scale.

Fig. 3 is a front elevation of the parts shown in Fig. 2.

Fig. 4 is a sectional view on line 4—4 of Fig. 3.

Fig. 5 is a side view of one of the nozzles and Fig. 6 is a longitudinal central section thereof.

Fig. 7 is a plan view of the connecting link.

Fig. 8 is a front view similar to Fig. 3 of a three-nozzle construction and Fig. 9 is a plan view of the connecting link therefor.

Fig. 10 is a side view of a nozzle set embodying my invention showing two connected sprayer nozzles with one of them attached to the valved outlet of a hose.

Referring to the drawings in a more particular description and first to Figs. 1 to 7, it will be seen that the sprayer is of the conventional form wherein air under pressure is forced through the air outlet pipe 10 past the material outlet pipe 11 located within the air pipe 10 to a nozzle 12 screw-threaded upon the external screw threads of the air outlet pipe 10 whereby spraying liquid is brought up from the receptacle 13 through the material outlet or liquid pipe 11 and more or less atomized by contact with the air within the nozzle and forced out from the nozzle as spray of more or less fineness according to the character of the sprayer and nozzle and the adjustment of said parts. The sprayer illustrated is of the hand-operated type wherein the air pressure is obtained by reciprocation of the piston 14 within the cylinder 15 by piston rod 16 operated from without the cylinder 14 by a handle (not shown). In the sprayer illustrated the receptacle 13 is secured to the lower side of the forward end of the pump cylinder 15 as by a screw-threaded neck 17 being provided upon the top of the receptacle to be engaged by a screw-threaded cap 18 permanently secured to the bottom side of the cylinder 15. The material outlet pipe 11 extends from the lower part of the receptacle 13 up through said neck and through an opening in the top of said cap 18 through the air chamber 19 in the forward end of the cylinder 15 and thence forwardly through the air outlet pipe 10.

It will be understood, however, that my invention is not limited to the details of construction of the receptacle and air pump mentioned, but is broadly applicable to any sprayer nozzle where it is desired to selectively attach to the air outlet pipe either of the two nozzles or any one of more than two nozzles in the main similar in construction but having varying outlet formations.

The nozzles 12 are cup-shaped in general form having a cavity 20 extending thereinto from the rear end which cavity is screw-threaded to fit the externally screw-threaded air outlet pipe 10. At the rear end each nozzle is enlarged to form a flange 21 the periphery of which is preferably knurled or milled to provide a convenient hold for the operator to place the nozzle upon the sprayer or adjust the nozzle upon the sprayer. At the forward end of the nozzle there is provided the small outlet opening for the escape of the mixed liquid and air in the form of spray. In the upper nozzle shown in Fig. 4 the spray outlet opening designated as 22 is directly in the end of the nozzle and longitudinally and centrally arranged therein so as to direct the spray forward. In the lower nozzle shown in said Fig. 4, the spray outlet designated as 23 is shown as arranged at an angle to the axis of the nozzle so as to direct the spray at an angle to the axis of the nozzle. When such an angularly arranged nozzle hole is used it may be adjusted upon the sprayer so as to direct the spray either upwardly or downwardly or to either side as may be desired. It will be understood, however, that my invention is not limited to two nozzles having one outlet axially arranged and the other at an angle thereto, but that my invention may be broadly used whenever it is desired to equip the sprayer nozzle set with two or more nozzles of different spray outlet formations. For instance, both of two nozzles may have an axially arranged outlet but with one opening larger than the other or both nozzles may have said outlets arranged at an angle to the axis of the nozzle, but with said outlets of different size or arranged at different angles.

Intermediate the ends of each nozzle 12 and preferably immediately forward of the milled flange 21 there is provided on the outside of the nozzle an annular encircling groove 24. In each of these grooves 24 is loosely mounted the opposite fingers 25 and 26 of a C-shaped clip 27 provided upon opposite ends of a thin metal link 28. This metal link is shown separately in plan view in Fig. 7 and preferably is formed of thin sheet metal having sufficient resilience to enable the fingers 25 and 26 to be temporarily sprung apart so as to pass over the forward half of the nozzle to the groove 24 and then spring together enough to hold each nozzle securely in its end of the link.

Each nozzle is thus loosely and pivotally but permanently secured to its end of the link. When either nozzle is placed upon the air outlet pipe 10 the weight of the other or second nozzle causes said second nozzle and the link to hang downwardly from the first nozzle and entirely out of the way. The depending link and lower nozzle do not interfere with the operator manipulating the upper and operative nozzle nor is the link or lower and extra nozzle in the way as regards the operation of the sprayer.

Preferably the link 28 will be stamped out of thin sheet metal and as the two clips at the opposite ends of the link are rigid or integral with each other and in the same plane it will be seen that the extra nozzle can never swing forward to get in the way of the spray issuing from the operative nozzle. As the extra nozzle hangs downwardly it will not get in the way even if the operative nozzle has an angular outlet which has been set to direct spray either upwardly or to either side.

It is obvious that the operative nozzle may be removed in the usual way from the sprayer and the other nozzle attached to the air outlet pipe in the usual manner of an extra nozzle. My method of permanently but loosely connecting the two nozzles has the advantage of always assuring that the extra nozzle will be at hand when the change is made from one nozzle to the other. The method of connecting the two nozzles loosely but side by side obviates any possibility of the extra nozzle interfering with the work of the operative nozzle.

In Figs. 8 and 9 is shown another embodiment of my invention in that three nozzles of the same type as those shown in Figs. 1 to 7 are connected with a triangular shaped link 29 having three radially arranged C-shaped clips 27 each composed of opposite fingers 25 and 26 as shown in Fig. 9. It will be seen that when any one of the three nozzles is operatively connected to the outlet 10 the other two nozzles will hang below and to the right and left respectively of the vertical plane extending through the operative nozzle. The two nozzles not in use will still be out of the way of the spray coming from the operative nozzle and will not interfere with the user manipulating the upper nozzle to screw it on or off.

In Fig. 10 is shown a sprayer nozzle set embodying my invention in that two nozzles 30 and 31 of types commonly used in spraying water from hose are connected by a link 28 such as shown in Fig. 7. The nozzle 30 is shown as operatively connected to the outlet member 32 of the member 33 having a valve 34 with the member 33 attached to the end of hose 35. It will be obvious that either nozzle 30 or 31 may be attached to the house outlet according to the type of spray desired and that the extra nozzle will hang down from the operative nozzle in the same manner as already described with reference to the nozzle 12 when used directly upon a sprayer device.

What I claim as new and desire to secure by Letters Patent is:

1. A sprayer nozzle set consisting of a plurality of nozzles any one of which is adapted to be removably attached to an outlet member, said nozzles having different spray outlets and a link the terminals of which are respectively swingingly connected to said nozzles intermediate their length whereby any one of said nozzles may be mounted on said outlet member without interference by the rest of the nozzles and the rest of the set will be loosely attached to the operative nozzle.

2. A sprayer nozzle set consisting of a plurality of nozzles any one of which is adapted to be removably attached to an outlet member, said nozzles having different spray outlets and each provided with an external encircling groove and a link pivotally mounted at its ends upon said nozzles by means of a C-shaped clip at each end of said link engaging the annular encircling groove upon its nozzle whereby any one of said nozzles may be mounted on said outlet member without interference by the rest of the nozzles and the rest of the nozzles will be loosely attached to the operative nozzle.

3. A sprayer nozzle set consisting of a plurality of nozzles any one of which is adapted to be removably attached to an outlet member, said nozzles having different spray outlets and each provided with an external encircling groove and a link pivotally mounted at its ends upon said nozzles by means of a resilient clip at each end of said link adapted to be sprung into said annular encircling groove upon its nozzle whereby any one of said nozzles may be mounted on said outlet member without interference by the rest of the nozzles and the rest of the nozzles will be loosely attached to the operative nozzle.

In witness whereof I have affixed my signature this 30th day of March, 1929.

MYRON H. SMITH.